United States Patent
Zhang

(10) Patent No.: US 9,383,182 B2
(45) Date of Patent: Jul. 5, 2016

(54) MEASURING DEVICE

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Bing-Jun Zhang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

(*) Notice: Subject to any disclaimer, the term of this patent is extended or adjusted under 35 U.S.C. 154(b) by 89 days.

(21) Appl. No.: 14/510,990

(22) Filed: Oct. 9, 2014

(65) Prior Publication Data

US 2016/0061578 A1  Mar. 3, 2016

(30) Foreign Application Priority Data

Aug. 29, 2014 (CN) .......................... 2014 1 0433804

(51) Int. Cl.
*G01B 5/14* (2006.01)
(52) U.S. Cl.
CPC ........................................ *G01B 5/14* (2013.01)
(58) Field of Classification Search
CPC ........................................................ G01B 5/14
USPC ............................ 33/783, 784, 791, 792, 797
See application file for complete search history.

(56) References Cited

U.S. PATENT DOCUMENTS

| | | | | | |
|---|---|---|---|---|---|
| 2,112,252 | A | * | 3/1938 | Sang | G01L 1/04 33/792 |
| 3,353,277 | A | * | 11/1967 | Johnson | G01B 5/204 116/202 |
| 4,875,294 | A | * | 10/1989 | Jefferson | G01B 3/28 33/539 |
| 5,421,101 | A | * | 6/1995 | Rank | G01B 5/30 33/784 |
| 5,454,175 | A | * | 10/1995 | Li | G01B 3/46 33/542 |
| 2010/0293803 | A1 | * | 11/2010 | Zhang | G01B 5/143 33/810 |
| 2011/0119946 | A1 | * | 5/2011 | Duarte | G01B 3/163 33/784 |
| 2011/0138645 | A1 | * | 6/2011 | Zhang | G01B 7/12 33/784 |
| 2013/0067760 | A1 | * | 3/2013 | Husted | G01B 3/24 33/784 |

FOREIGN PATENT DOCUMENTS

CN 202018265 U 1/2013

* cited by examiner

*Primary Examiner* — G. Bradley Bennett
(74) *Attorney, Agent, or Firm* — ScienBiziP, P.C.

(57) ABSTRACT

A measuring device includes a support frame, a distance sensor and display (DSD), and a measuring arm. The support frame includes a first support arm, a linking rod, a poke rod, an elastic member, and a second support arm. The DSD includes a movable measuring head. A fixed measuring head is arranged coaxially with the movable measuring head to measure a distance between them. The poke rod includes a poke portion and a resisting portion. When the poke portion is pulled towards the first support arm, the resisting portion can resist against the linking rod, and the linking rod rotates to move the measuring heads.

13 Claims, 6 Drawing Sheets

MEASURING DEVICE

FIELD

The subject matter herein generally relates to the field of measuring devices.

BACKGROUND

In the field of machining, it is necessary to measure the dimensions of a work piece, such as the diameter, the thickness, and the linear length. It is also necessary to use a measuring device for the inspection of these dimensions to make sure that predetermined tolerances are met. In general, the internal and external dimensions of surfaces of a work piece and the lateral distances along the work piece have been measured by calipers, micrometers, and rulers. Each measurement must be made separately.

BRIEF DESCRIPTION OF THE DRAWINGS

Implementations of the present technology will now be described, by way of example only, with reference to the attached figures.

DETAILED DESCRIPTION

Figure 1:
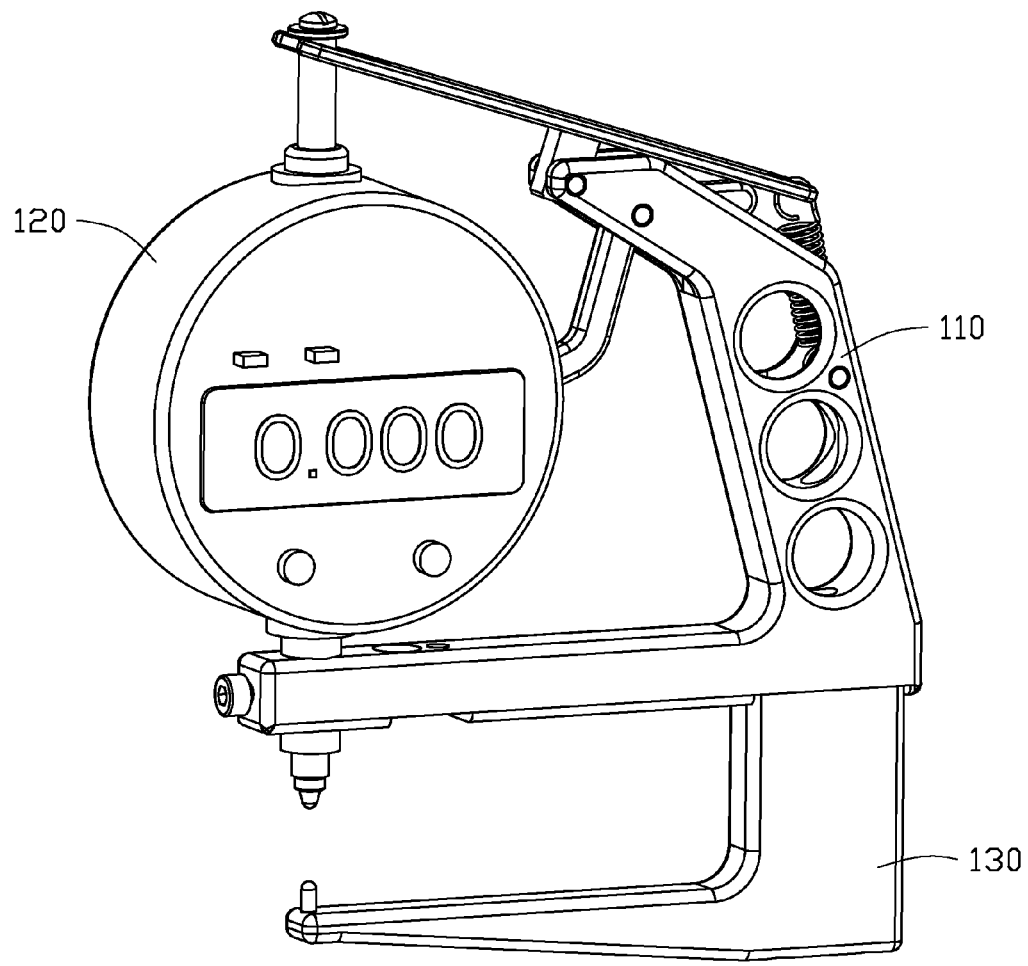
FIG. 1 is an isometric view of a measuring device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

FIG. 1 illustrates a measuring device 100. The measuring device 100 can include a support frame 110, a distance sensor and display (DSD) 120, and a measuring arm 130. The DSD 120 can be mounted to the support frame 110. The measuring arm 130 can be mounted under the support frame 110. A length of the measuring arm 130 can be selectively and appropriately decided according to the practical requirement. In the illustrated embodiment, the measuring arm 130 can be 50 millimeters or greater.

Figure 2:
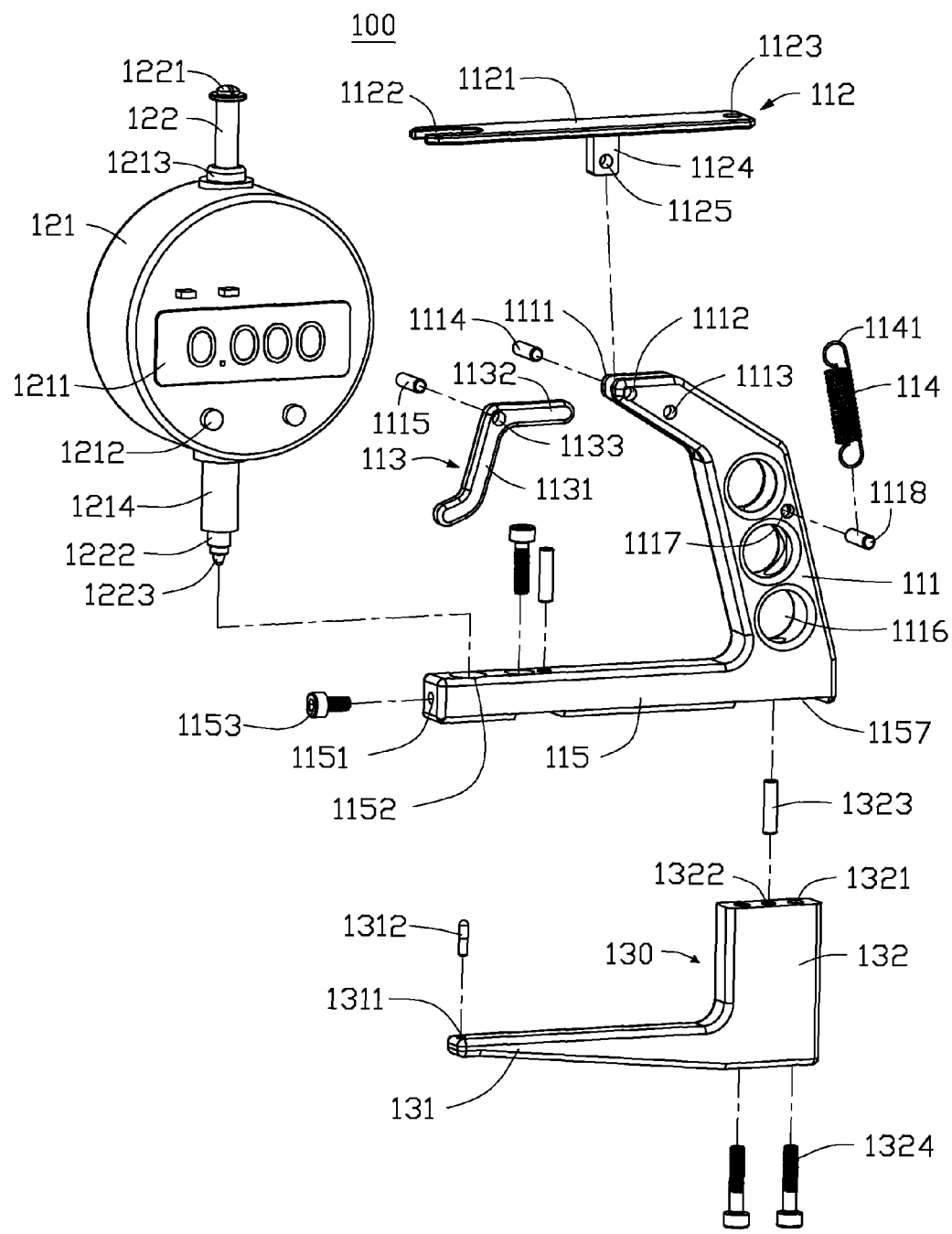
FIG. 2 is an exploded isometric view of the measuring device as shown in FIG. 1.

FIG. 2 illustrates that the support frame 110 can include a first support arm 111, a linking rod 112, a poke rod 113, a spring member 114, and a second support arm 115. The linking rod 112 and the poke rod 113 can be rotationally mounted to one end of the first support arm 111. One end of the spring member 114 can be connected to the linking rod 112, and the other end of the spring member 114 can be connected to the first support arm 111. The other end of the first support arm 111 can be extended along a pre-determined angle to form the second support arm 115.

One end of the first support arm 111 can define a receiving portion 1111, and the receiving portion 1111 can be used to receive the linking rod 112 and the poke rod 113. A top position of the receiving portion 1111 can define a first through hole 1112, and a first pivot rod 1114 can be mounted in the first through hole 1112. A substantially central position of the receiving portion 1111 can define a second through hole 1113, and a second pivot rod 1115 can be mounted in the second through hole 1113. The linking rod 112 can be rotationally mounted in the receiving portion 1111 through the first pivot rod 1114, and the poke rod 113 can be rotationally mounted in the receiving portion 1111 through the second pivot rod 1115. The other end of the first support arm 111 can define a plurality of holes 1116 to hold the first support arm 111, the holes 1116 can reduce the weight of the measuring device 100. A substantially central position of the first support arm 111 adjacent to the receiving portion 1111 can define a third through hole 1117, and a third pivot rod 1118 can be mounted in the third through hole 1117 to be fixed to one end of the spring member 114.

The linking rod 112 can include a panel 1121 and a raised portion 1124. A substantially central position of the linking rod 112 can extend to form the raised portion 1124. One end of the panel 1121 can define a substantially "U"-shaped trough 1122, and the other end of the panel 1121 can define a first fixed hole 1123. One end of the spring member 114 can be mounted in the first fixed hole 1123. The raised portion 1124 can define a second fixed hole 1125. The second fixed hole 1125 and the first through hole 1112 can be arranged coaxially, and the first pivot rod 1114 can pass the first through hole 1112 and the second fixed hole 1125 to fix the linking rod 112 to the first support arm 111. The linking rod 112 can revolve around the first pivot rod 1114.

The poke rod 113 can be substantially "S"-shaped. The poke rod 113 can include a poke portion 1131 and a resisting portion 1132. The resisting portion 1132 can be connected to the poke portion 1131 at a pre-determined angle. A joint portion of the poke portion 1131 and the resisting portion 1132 can define a third fixed hole 1133. The third fixed hole 1133 and the second through hole 1113 can be arranged coaxially, and the second pivot rod 1115 can pass through the second through hole 1113 and the third fixed hole 1133 to fix the poke rod 113 to the first support arm 111. The poke rod 113 can revolve around the second pivot rod 1115, and the resisting portion 1132 can resist against the end of the panel 1121 adjacent to the first fixed hole 1123.

Each end of the spring member 114 can include two rings 1141. One end of the spring member 114 can be mounted in the first fixed hole 1123 by a ring 1141, and the other end of the spring member 114 can be mounted in the third pivot rod 1118 by the other ring 1141. Thus, the linking rod 112 can be pulled elastically by the spring member 114.

The second support arm 115 can be configured for mounting the measuring arm 130. A side of the second support arm 115 away from the first support arm 111 can define a screw hole 1151. The second support arm 115 can further define a receiving hole 1152. The DSD 120 can be mounted in the receiving hole 1152. The screw hole 1151 can connect to the receiving hole 1152 vertically. A screw 1153 can be screwed into the screw hole 1151 and resist against the DSD 120. A joint portion of the second support arm 115 and the first support arm 111 can define a first groove 1157, and a plurality of screw holes (not shown) and positioning holes (not shown) can be defined in the first groove 1157, for positioning and mounting the measuring arm 130.

The DSD 120 can be a digital device. The rotary-switching of the DSD 120 can be selectively and appropriately decided according to the practical requirement. The DSD 120 can include a base 121 and a measuring rod 122. The measuring rod 122 can be received in the base 121 elastically. The base 121 can include a digital screen 1211 and a plurality of buttons 1212. The buttons 1212 can include a reset and set-to-zero function in relation to the screen 1211. A top position of the base 121 can include a ring 1213, a bottom position of the base 121 corresponding to the ring 1213 can include a sleeve 1214 configured to receive the measuring rod 122. The measuring rod can include a head portion 1221 and an end portion 1222. In other embodiments, the head portion 1221 can be a plate detachably mounted to the measuring rod 122. The head portion 1221 can be received in the trough 1122. The end portion 1222 can include a movable measuring head 1223. The end portion 1222 can pass into the ring 1213 and out of the sleeve 1214. In other embodiments, the DSD 120 can be a mechanical measuring device.

The measuring arm 130 can be substantially "L"-shaped. The measuring arm 130 can include an extending portion 131 and a mounting portion 132. The mounting portion 132 can be connected to the extending portion 131 vertically. One end of the extending portion 131 can define a receiving hole 1311, and a fixed measuring head 1312 can be mounted in the receiving hole 1311. The mounting portion 132 can define a plurality of through holes 1321 and positioning holes 1322 corresponding to the through holes and positioning holes (not shown) in the first groove 1157. The mounting portion 132 can be received in the first groove 1157, and a positioning pivot rod 1323 can be received in the positioning holes 1322 and the positioning holes (not shown) in the first groove 1157. The first groove 1157 can restrict the movement of the measuring arm 130 along an extending direction of the second support arm 115. The positioning pivot rod 1323 can restrict the movement of the measuring arm 130 along a direction which is perpendicular to the plane of the first support arm 111 and the second support arm 115. The first groove 1157 and the positioning pivot rod 1323 can allow the fixed measuring head 1312 and the movable measuring head 1223 to be arranged coaxially. A plurality of screws 3124 can pass through the through holes 1321 and be screwed into the through hole (not shown) in the first groove 1157, to fix the measuring arm 130 to the second support arm 115.

Since the elasticity of the spring member 114 can be greater than that required to receive the DSD 120, the head portion 1221 can be made to resist against the trough 1122 elastically and can be pulled up, and the screen 1211 can display a distance between the fixed measuring head 1312 and the movable measuring head 1223.

Figure 3:
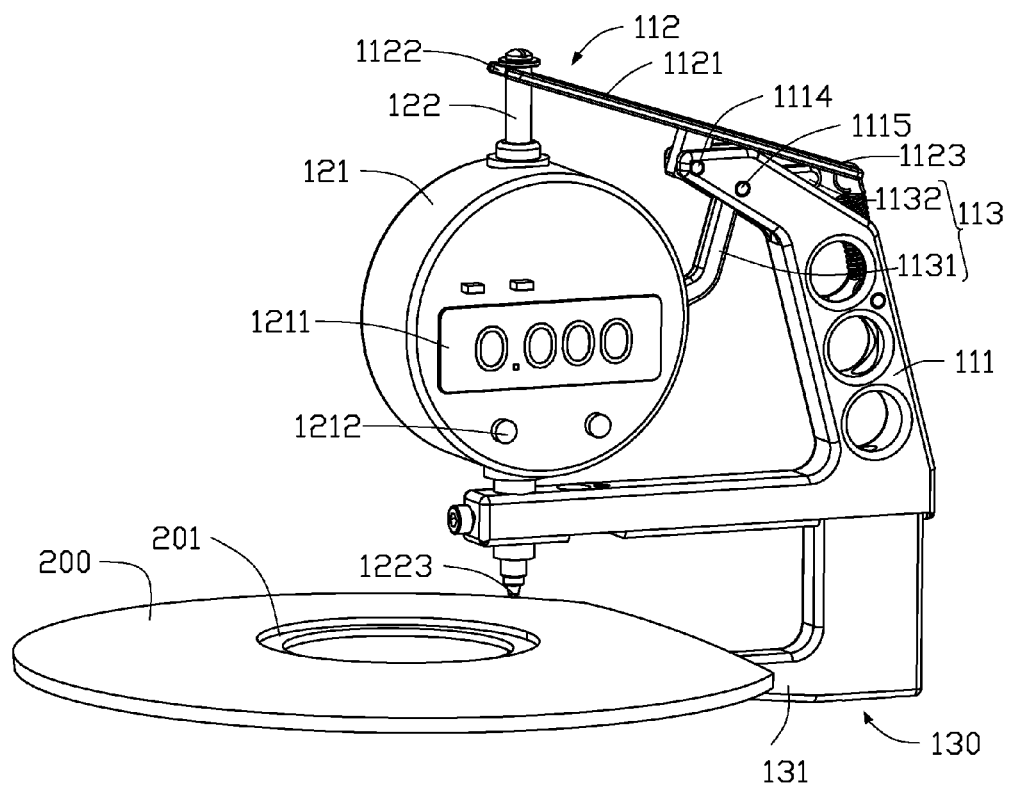
FIG. 3 is an isometric view of the measuring device of FIG. 1 in operation.

FIG. 3 illustrates that the measuring arm 130 can be used when a length from an edge of a work piece 200 to a groove 201 in a substantially central position of the work piece 200 is less than a length of the extending portion 131.

In use, the poke portion 1131 can be pulled towards the first support arm 111. The poke rod 113 can revolve around the second pivot rod 1115. The resisting portion 1132 can resist against the end of the panel 1121 adjacent to the first fixed hole 1123. The linking rod 112 can revolve around the first pivot rod 1114. The other end of the panel 1121 can move towards the base 121. The measuring rod 122 can move towards the measuring arm 130. When the poke portion 1131 is loosened, the spring member 114 can pull on the end of the panel 1121 adjacent to the first fixed hole 1123. The linking rod 112 can revolve around the first pivot rod 1114. The measuring rod 122 can move away from the measuring arm 130. So, the poke portion 1131 can be pulled to allow the movable measuring head 1223 to periodically touch the fixed measuring head 1312 (as shown in FIG. 2). Then, the poke portion 1131 can be pulled. The movable measuring head 1223 can maintain contact with the fixed measuring head 1312. The buttons 1212 can be triggered to reset the data on the screen 1211. Thus, a zero position can be set. Then, the poke portion 1131 can be freed.

The fixed measuring head 1312 (as shown in FIG. 2) can be positioned against the bottom surface of the groove 201. Then, the poke portion 1131 can be pulled towards the first support arm 111, and the movable measuring head 1223 can resist against the upper surface of the groove 201. The measuring device 100 can sway slightly, and the minimum displayed on the screen 1211 can be the thickness of the groove 201. After measuring, the poke portion 1131 can be freed.

Figure 4:
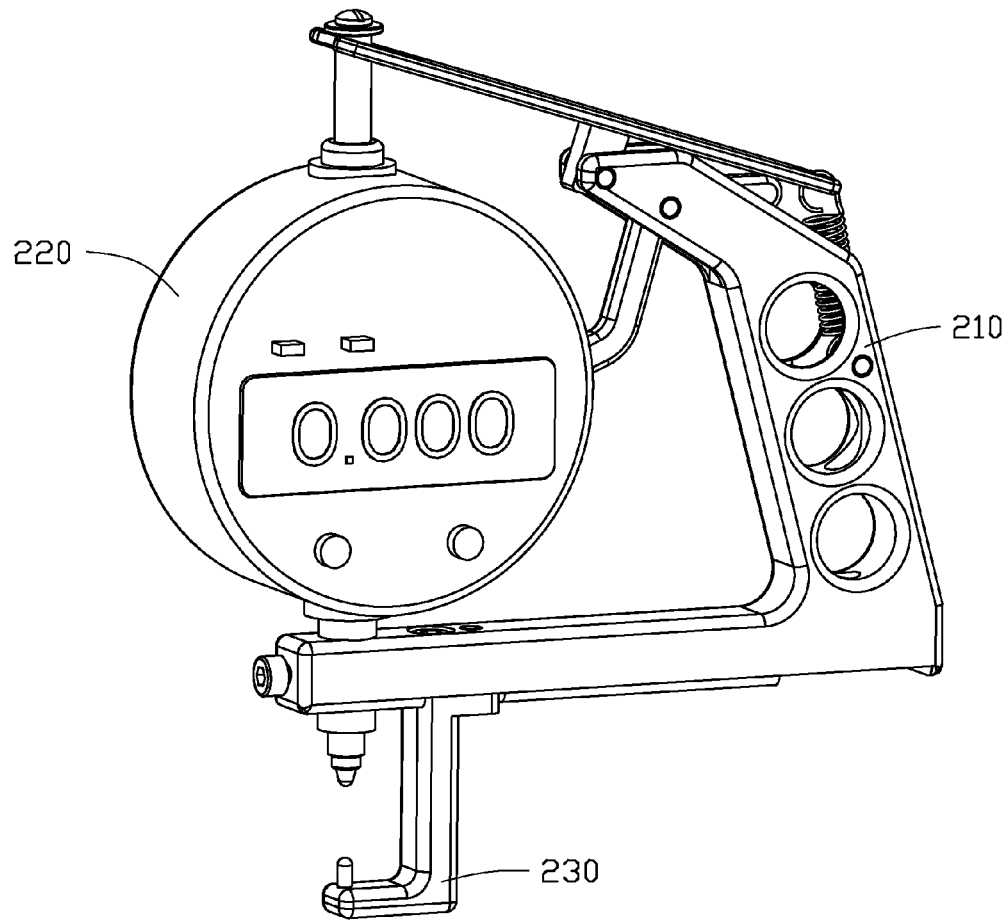
FIG. 4 is an isometric view of another embodiment of a measuring device.

FIG. 4 illustrates another embodiment of a measuring device 100 which can include a support frame 210, a distance sensor and display (DSD) 220, and a measuring arm 230. In the illustrated embodiment, the measuring arm 230 can be less than 50 mm.

Figure 5:
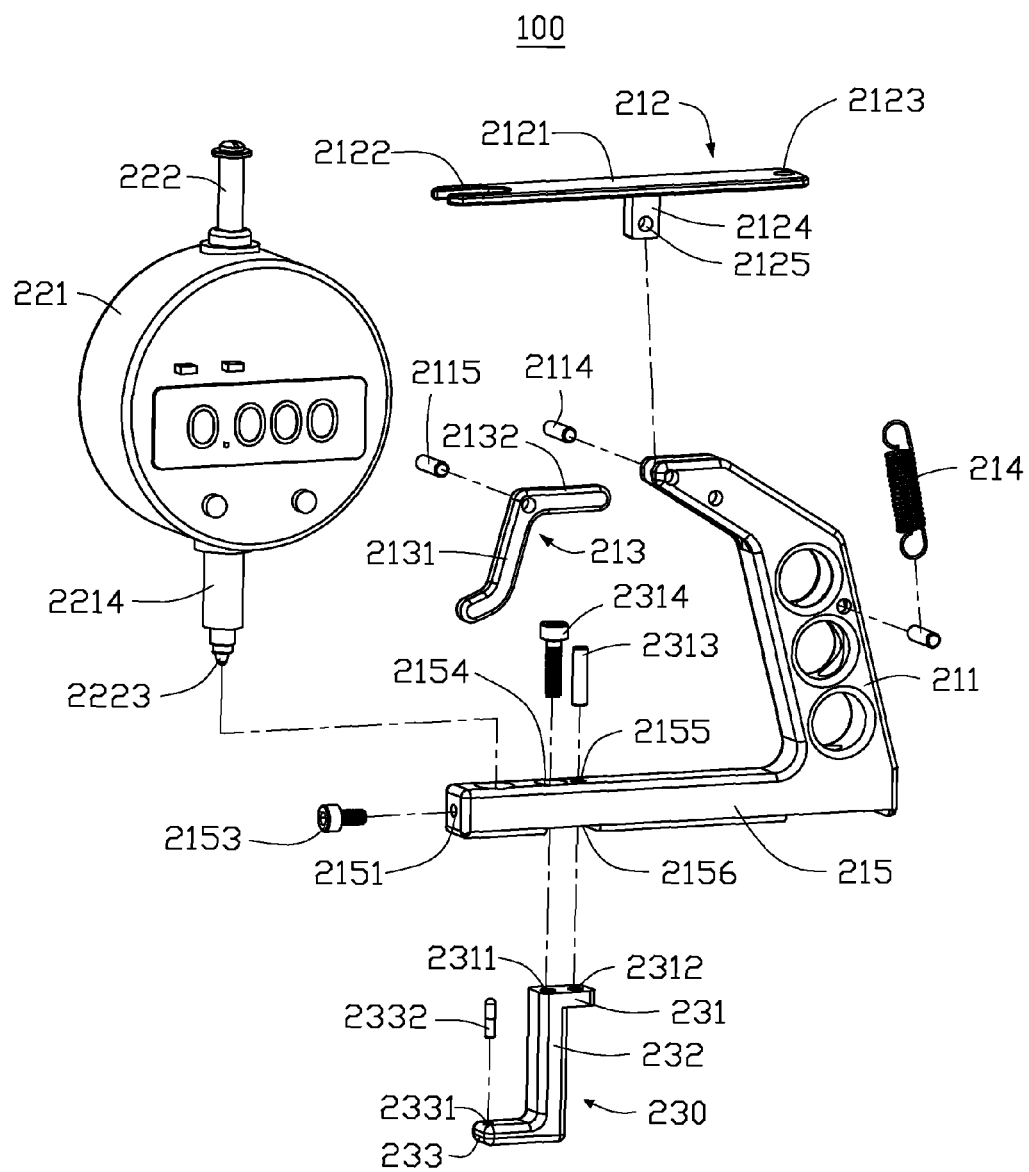
FIG. 5 is an exploded isometric view of the measuring device as shown in FIG. 4.

FIG. 5 illustrates that the support frame 210 can be substantially the same as the support frame 110. The support frame 210 can include a first support arm 211, a linking rod 212, a poke rod 213, a spring member 214, and a second support arm 215. The linking rod 212 and the poke rod 213 can be rotationally mounted to one end of the first support arm 211 by a first pivot rod 2114 and a second pivot rod 2115. One end of the spring member 214 can be connected to the linking rod 212, and the other end of the spring member 214 can be connected to the first support arm 211. The other end of the first support arm 211 can be extended at a pre-determined angle to form the second support arm 215.

The linking rod 212 can include a panel 2121 and a raised portion 2124. A substantially central position of the linking rod 212 can be extended to form the raised portion 2124. One end of the panel 2121 can define a substantially "U"-shaped trough 2122, and the other end of the panel 2121 can define a first fixed hole 2123. One end of the spring member 214 can be mounted in the first fixed hole 2123. The raised portion 2124 can define a second fixed hole 2125. The linking rod 212 can revolve around the first pivot rod 2114.

The poke rod 213 can be substantially "S"-shaped. The poke rod 213 can include a poke portion 2131 and a resisting portion 2132. The resisting portion 2132 can be connected to the poke portion 2131 at a pre-determined angle. The poke rod 213 can revolve around the second pivot rod 2115, and the resisting portion 2132 can resist against the end of the panel 2121 adjacent to the first fixed hole 2123.

One end of the second support arm 215 can define a through hole 2154 and a positioning hole 2155. A bottom side of the second support arm 215 corresponding to the through hole 2154 and the positioning hole 2155 can define a second groove 2156. The second groove 2156 can be configured as a mounting for the measuring arm 230.

The DSD 220 can include a base 221 and a measuring rod 222. The measuring rod 222 can be received in the base 221 elastically. A bottom position of the base 221 can include a sleeve 2214 configured to receive the measuring rod 222. One end of the measuring rod 222 can include a movable measuring head 2223.

The measuring arm 230 can be substantially "S"-shaped. The measuring arm 230 can include a mounting portion 231, a connecting portion 232, and an extending portion 233. The mounting portion 231 can define a plurality of screw holes 2311 and positioning holes 2312 corresponding to the through hole 2154 and the positioning hole 2155. The mounting portion 231 can be received in the second groove 2156, and a positioning pivot rod 2313 can be received in the positioning holes 2312 and the positioning holes 2155 in the second groove 2156. A plurality of screws 2314 can pass through the through hole 2154 and be screwed into the screw hole 2311 to fixed the measuring arm 230 to the second support arm 215. An end position of the extending portion 233 can define a receiving hole 2331. A fixed measuring head 2332 can be mounted in the receiving hole 2331. The second groove 2156 can restrict the movement of the measuring arm 230 along an extending direction of the second support arm 215. The positioning pivot rod 2313 can restrict the movement of the measuring arm 230 along a direction which is perpendicular to the plane of the first support arm 211 and the second support arm 215. The second groove 2156 and the positioning pivot rod 2313 can allow the fixed measuring head 2332 and the movable measuring head 2223 to be arranged coaxially.

Figure 6:
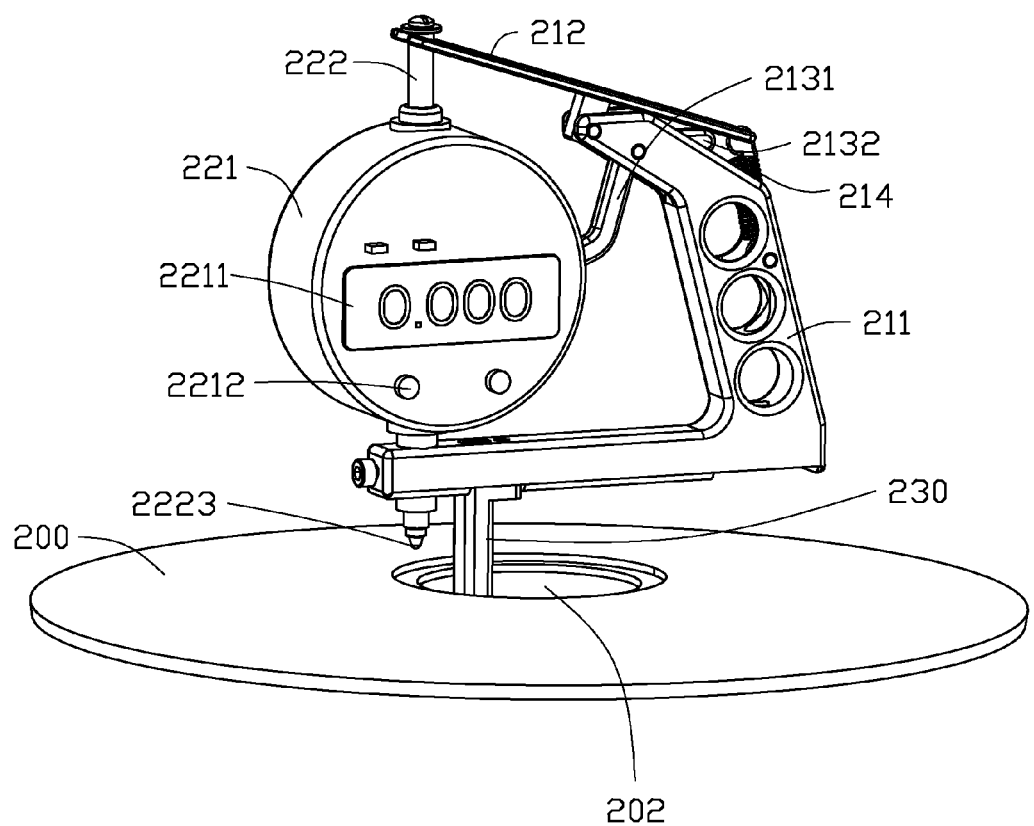
FIG. 6 is an isometric view of the measuring device of FIG. 4 in operation.

FIG. 6 illustrates that the measuring arm 230 can be used when a hole 202 is of great size. In use, the base 221 can be set a zero position. The measuring arm 230 can be positioned in the hole 202. The fixed measuring head 2332 (as shown in FIG. 5) can be positioned against the bottom surface of the work piece 200. Then, the poke portion 2131 can be pulled towards the first support arm 211, and the movable measuring head 2223 can resist against the upper surface of the work piece 200. The measuring device 100 can sway slightly, and the minimum displayed on a screen 2211 can be the thickness of the work piece 200. After measuring, the poke portion 2131 can be freed.

The embodiments shown and described above are only examples. Many details are often found in the art such as the other features of a measuring device 100. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A measuring device comprising:
    a support frame comprising
        a first support arm,
        a linking rod and a poke rod rotationally mounted to one end of the first support arm, the poke rod having a poke portion, and a resisting portion connected to the poke portion along a pre-determined angle;
        a spring member connected to one end of the linking rod and the first support arm, and
        a second support arm extending from the other end of the first support arm along a pre-determined angle;
    a distance sensor and display mounted to the support frame, the distance sensor and display comprising
        a base, and
        a measuring rod elastically received in the base and having a head portion connected to the other end of the linking rod, and an end portion with a movable measuring head; and
    at least one measuring arm mounted to the support frame, the measuring arm having a fixed measuring head,
    wherein the base is configured to measure a moving distance of the measuring rod;
    the movable measuring head and the fixed measuring head are arranged coaxially;
    the poke portion is configured such that when pulled towards the first support arm, the poke rod is turned, enabling the resisting portion to resist against one end of the linking rod connected to the spring member; and
    the spring member elastically pulls the measuring rod.

2. The measuring device as claimed in claim 1, wherein one end of the base comprises a ring, and the other end of the base corresponding to the ring comprises a sleeve.

3. The measuring device as claimed in claim 2, wherein the head portion can resist against the ring elastically, and the end portion can pass through the sleeve.

4. The measuring device as claimed in claim 1, wherein the base comprises a screen and a plurality of buttons are triggered to clean the data on the screen.

5. The measuring device as claimed in claim 1, wherein:
    one end of the first support arm is concaved to form a receiving portion;
    a top position of the receiving portion defines a first through hole configured to mount the linking rod;
    a substantially central position of the receiving portion defines a second through hole configured to mount the poke rod.

6. The measuring device as claimed in claim 1, wherein the first support arm defines a plurality of holes configured to conveniently hold the first support arm.

7. The measuring device as claimed in claim 1, wherein a substantially central position of the first support arm defines a third through hole configured to connect one end of the spring member.

8. The measuring device as claimed in claim 1, wherein the linking rod comprises a panel and a raised portion extending from a substantially central position of the panel.

9. The measuring device as claimed in claim 8, wherein one end of the panel defines a trough, and the head portion is received in the trough.

10. The measuring device as claimed in claim 9, wherein the other end of the panel defines a first fixed hole, and one end of the spring member is connected to the first fixed hole;
    the raised portion defines a second fixed hole.

11. The measuring device as claimed in claim 1, wherein the second support arm defines a plurality of grooves, and a plurality of through holes and positioning holes;
    the measuring arm are mounted in the grooves, and the measuring arm comprises an extending portion;
    a length of each extending portion is different.

12. The measuring device as claimed in claim 1, wherein the extending portion defines a receiving hole, and the fixed measuring head is mounted in the receiving hole.

13. The measuring device as claimed in claim 1, wherein
a side of the second support arm away from the first support arm defines a screw hole;
the second support arm further defines a receiving hole adjacent to the screw hole;
the screw hole is connected to the receiving hole vertically.

* * * * *